(12) United States Patent
Hanewinkel, III et al.

(10) Patent No.: US 7,325,772 B1
(45) Date of Patent: Feb. 5, 2008

(54) AIRCRAFT HEAT SINK AND ELECTRONICS ENCLOSURE

(75) Inventors: William H Hanewinkel, III, Salt Lake City, UT (US); Mark G Williams, West Valley City, UT (US)

(73) Assignee: L-3 Communications Corporation, New York, NY (US)

(*) Notice: Subject to any disclaimer, the term of this patent is extended or adjusted under 35 U.S.C. 154(b) by 518 days.

(21) Appl. No.: 10/656,695

(22) Filed: Sep. 4, 2003

(51) Int. Cl.
    *B64C 1/14* (2006.01)

(52) U.S. Cl. .................. 244/129.4; 165/41; 165/73; 244/117 A

(58) Field of Classification Search .............. 244/57, 244/117 A, 129.4, 133; 165/41, 73
    See application file for complete search history.

(56) References Cited

U.S. PATENT DOCUMENTS

| | | | | |
|---|---|---|---|---|
| 2,441,279 A | * | 5/1948 | McCollum | 165/41 |
| 2,798,695 A | * | 7/1957 | Arleque | 165/80.1 |
| 3,438,430 A | | 4/1969 | Kestemont | 165/32 |
| 3,550,678 A | * | 12/1970 | Pfouts | 165/44 |
| 3,727,059 A | * | 4/1973 | Reese | 250/506.1 |
| 4,027,206 A | | 5/1977 | Lee | 361/697 |
| 4,057,104 A | | 11/1977 | Altoz | 165/272 |
| 4,273,183 A | | 6/1981 | Altoz et al. | 165/277 |
| 4,557,319 A | | 12/1985 | Arnold | 165/44 |
| 4,769,557 A | * | 9/1988 | Houf et al. | 307/147 |
| 4,786,015 A | | 11/1988 | Niggemann | 244/117 A |
| 4,819,720 A | | 4/1989 | Howard | 165/104.34 |
| 4,926,935 A | | 5/1990 | Haushalter | 165/185 |
| 4,969,509 A | | 11/1990 | Merensky | 165/41 |
| 4,974,119 A | | 11/1990 | Martin | 361/720 |
| 5,184,141 A | | 2/1993 | Connolly et al. | 343/705 |
| 5,422,787 A | | 6/1995 | Gourdine | 361/697 |
| 5,667,168 A | | 9/1997 | Fluegel | 244/117 A |
| 5,702,073 A | | 12/1997 | Fluegel | 244/57 |
| 5,794,888 A | | 8/1998 | Lutzer | 244/117 A |
| 5,910,884 A | | 6/1999 | Garza et al. | 361/690 |
| 6,003,586 A | * | 12/1999 | Beane | 164/63 |
| 6,172,873 B1 | | 1/2001 | Davis et al. | 361/716 |
| 6,205,803 B1 | | 3/2001 | Scaringe | 62/259.2 |
| 6,352,103 B1 | | 3/2002 | Chu et al. | 165/80.3 |
| 6,401,807 B1 | | 6/2002 | Wyler et al. | 165/121 |
| 6,404,628 B1 | | 6/2002 | Nagashima et al. | 361/690 |
| 6,435,454 B1 | | 8/2002 | Engelhardt | 244/117 A |
| 6,460,353 B2 | | 10/2002 | Udobot et al. | 62/86 |
| 6,462,717 B1 | | 10/2002 | Wheelock et al. | 343/872 |
| 6,527,227 B1 | | 3/2003 | Lambiaso | 244/118.1 |
| 6,535,397 B2 | | 3/2003 | Clark et al. | 361/788 |
| 6,568,464 B1 | * | 5/2003 | He et al. | 165/80.3 |

\* cited by examiner

*Primary Examiner*—Rob Swiatek
(74) *Attorney, Agent, or Firm*—Harrington & Smith, PC

(57) ABSTRACT

An aircraft component including a first section adapted to be attached at an exterior surface of an aircraft to close an access opening through the exterior surface; and a second section extending outward from the first section and forming heat transfer surfaces to transfer heat from the first section to air passing by the exterior surface and second section during flight of the aircraft. The first and second sections are integrally formed as a one-piece member.

21 Claims, 5 Drawing Sheets

AIRCRAFT HEAT SINK AND ELECTRONICS ENCLOSURE

BACKGROUND OF THE INVENTION

1. Field of the Invention

The present invention relates to aircraft electronics and, more particularly, to a housing of aircraft electronics which comprises a heat sink.

2. Brief Description of Prior Developments

U.S. Pat. No. 5,184,141 discloses a structurally embedded electronics assembly for an aircraft. The assembly in that patent relates to an antenna. There are known other types of aircraft electronic circuitry which requires heat removal and electromagnetic interference (EMI) shielding. There is a need for an aircraft electronic device which can efficiently remove heat from the device, but with a reduced overall weight to the system and, which can be packaged in a relatively small aircraft, such as for an unmanned aerial vehicle (UAV).

SUMMARY OF THE INVENTION

In accordance with one aspect of the present invention, an aircraft component is provided including a first section adapted to be attached at an exterior surface of an aircraft to close an access opening through the exterior surface; and a second section extending outward from the first section and forming heat transfer surfaces to transfer heat from the first section to air passing by the exterior surface and second section during flight of the aircraft. The first and second sections are integrally formed as a one-piece member.

In accordance with another aspect of the present invention, an aircraft electronic device is provided comprising electronic circuitry which generates heat; and a housing having the electronic circuitry located in the housing. The housing comprises a first wall member with a heat sink section that extends in an outward direction at an outer side of the first wall member, and a connection section located at an inner side of the first wall member. Other walls of the housing are attached to the connection section to form an enclosure housing the electronic circuitry. The first wall member further comprises a flange extending from the connection section and adapted to be attached to an exterior side of the aircraft.

In accordance with another aspect of the present invention, an aircraft is provided comprising a drive unit; an air frame comprising at least one airfoil, the drive unit being attached to the air frame; and an electronic communications device connected to the air frame. The electronic communications device comprises a printed circuit board and a housing. The housing has a first side section connected at an exterior side of the airfoil to close an access opening through the airfoil. The first side section of the housing forms a wall of an enclosure for the printed circuit board.

In accordance with one method of the present invention, a method of assembling an electronic device with an aircraft is provided comprising steps of providing the electronic device with a housing having a side with a heat sink; inserting the electronic device into an access aperture in the aircraft; and attaching the side of the housing of the electronic device to the aircraft to close the access aperture, wherein the heat sink is located in the access aperture.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
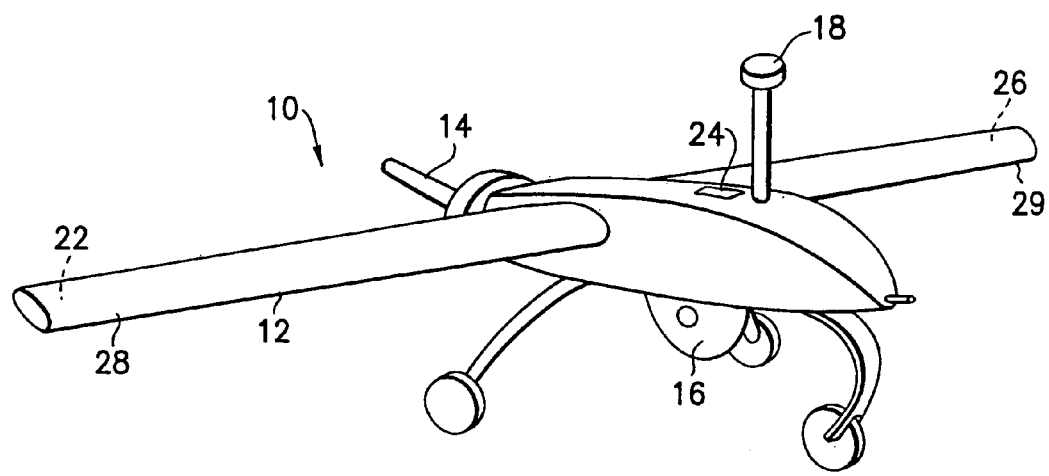
FIG. 1 is a perspective view of an aircraft incorporating features of the present invention.

Referring to FIG. 1, there is shown a perspective view of an aircraft 10 incorporating features of the present invention. Although the present invention will be described with reference to the exemplary embodiment shown in the drawings, it should be understood that the present invention can be embodied in many alternate forms of embodiments. In addition, any suitable size, shape or type of elements or materials could be used.

The present invention is generally directed to an electronics enclosure with an external extended surface heat sink that also provides structural and contour components to an aircraft wing airfoil. One of the purposes of the present invention is to reduce the complexity and weight of installing an electronics enclosure into an aircraft wing by integrating the extended surface heat sink of the enclosure to the shape of the wing and function as a panel to close the wing's access cutout. The present invention can reduce redundant structure in the aircraft wing. The present invention can close the electronic enclosure for EMI requirements. The present invention can allow for a continuous contour of the wing surface with an integrated extended heat transfer surface. The present invention can provide an angular tilt of the enclosure to reduce interferences for the cable interconnection with the wing components. The present invention can create a very rigid structure for closing the wing access cutout.

In the embodiment shown, the aircraft 10 is an unmanned aerial vehicle (UAV) which generally comprises an air frame 12, a drive 14, a viewing unit 16 and an antenna assembly 18. The air frame 12 is a fixed wing type of air frame. However, features of the present invention could alternatively be used in a non-fixed wing aircraft, such as the tail of a helicopter. The drive 14, in the embodiment shown, comprises a motor and a propeller. However, in alternate embodiments, any suitable type of drive could be used, such as a turbine engine. The viewing unit 16 includes an optical camera, but could alternatively or additionally comprise an infrared camera or any other suitable type of viewing device. The antenna assembly 18 is used to allow remote control of the aircraft and transmission of signals from the viewing unit 16 back to a remote viewing area.

The antenna assembly 18 is part of an airborne communications assembly. The communications assembly uses radio frequency (RF) signals to communicate with a remote location. The communications assembly generally comprises the antenna assembly 18, an airborne microwave modem assembly 22, a remote front end 24 and an airborne link interface assembly 26. The remote front end 24 receives Return Link RF signals from the airborne microwave modem assembly 22, amplifies and filters the signals, and sends the signals to the antenna in the antenna assembly 18. The remote front end 24 also receives the Control Link RF signals from the antenna, filters and amplifies the signals, and sends the signals to the airborne microwave modem assembly 22.

In the embodiment shown, the modem assembly 22 and the interface assembly 26 are each located in a separate one of the wings 28, 29, respectively, of the air frame 12. However, features of the present invention could be located at any suitable location on the air frame as further understood from the description below. For example, the electronics module, such as 22 and/or 26, could be located in the same wing, or more or less than two electronics modules with an integrated external heat transfer system of the present invention could be provided. For example, the aircraft might only have one such module.

Figure 2:
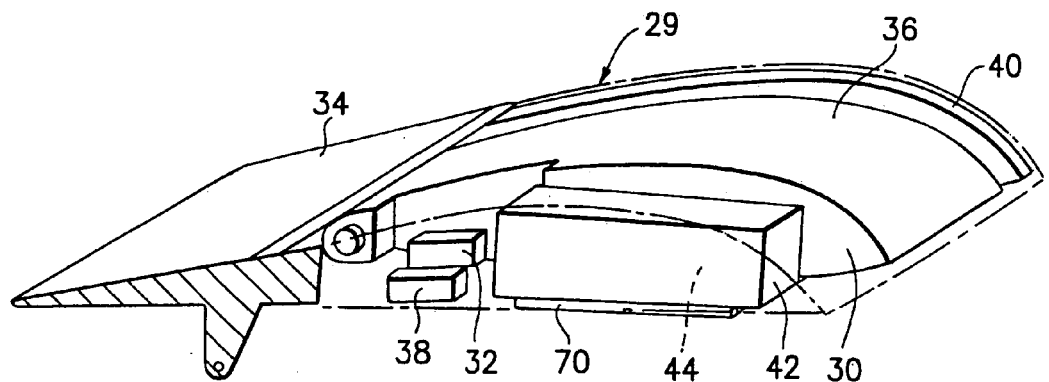
FIG. 2 is a partial diagrammatic cross sectional view of one of the wings of the aircraft shown in FIG. 2.
Figure 3:
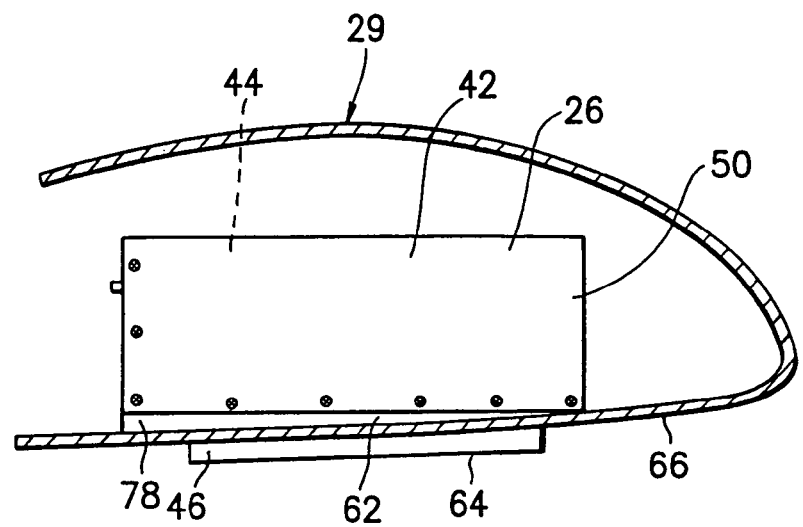
FIG. 3 is a cross sectional view of the wing shown in FIG. 2.
Figure 4:
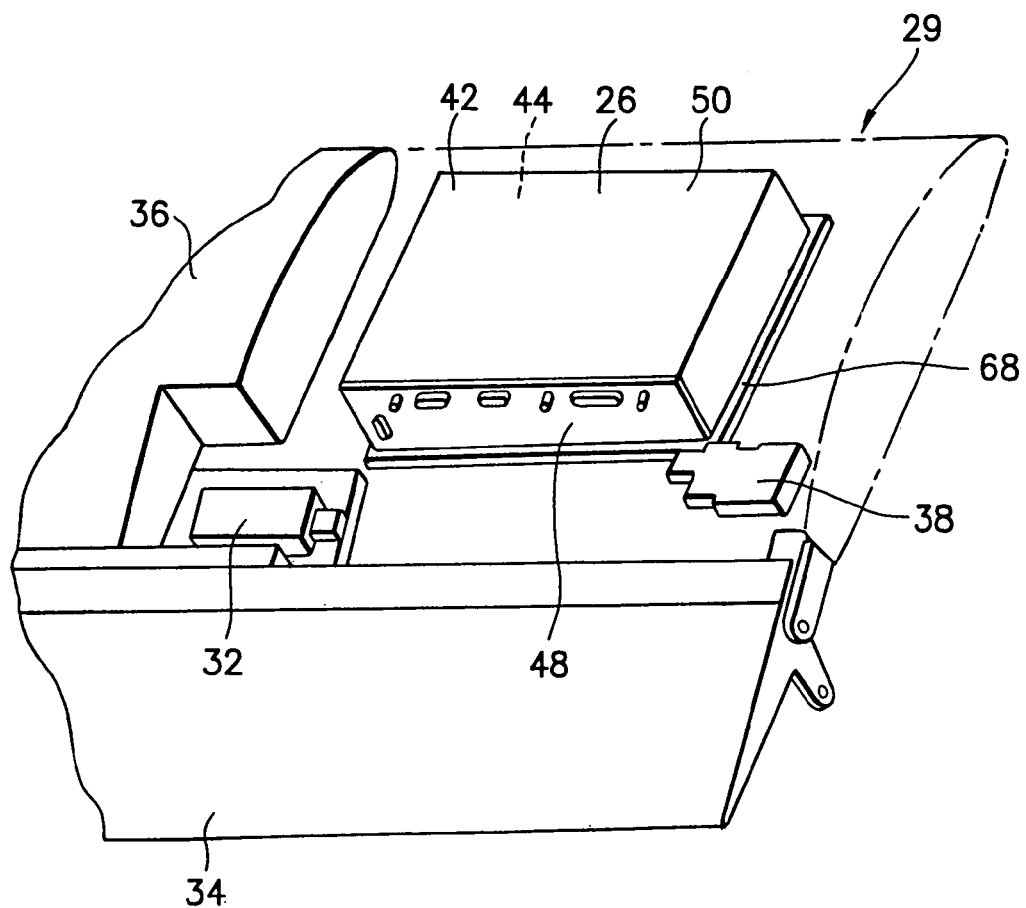
FIG. 4 is a partial diagrammatic cross sectional view of the wing shown in FIG. 2.

Referring also to FIGS. 2-4, diagrammatic cross sectional views of the left wing 29 is shown. The wing 29 forms an airfoil for the aircraft. The wing 29 includes an interior chamber 30. Various components are located inside the chamber 30 including, for example, controls or sensors, such as servo actuator 32 for a flap 34, a fuel tank 36, and perhaps other electronic components, such as actuator 38 for example. In the embodiment shown, the interface assembly 26 is located in the chamber 30. The chamber 30 also comprises structural struts 40 and could comprise additional components as generally known in the aeronautics industry.

Figure 5:
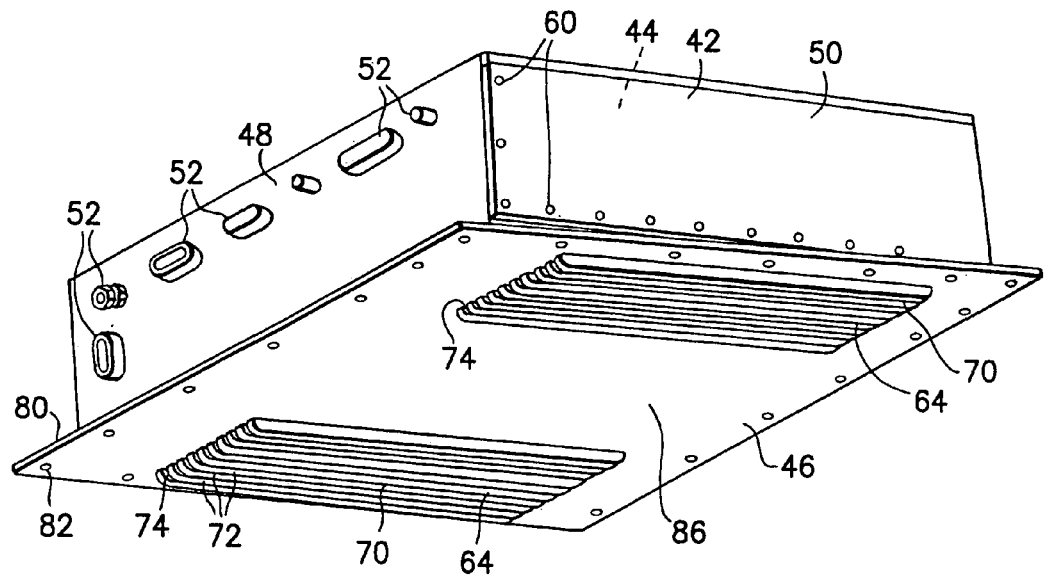
FIG. 5 is a perspective view of the electronic device shown in FIGS. 2-4 showing a bottom side of the device.
Figure 6:
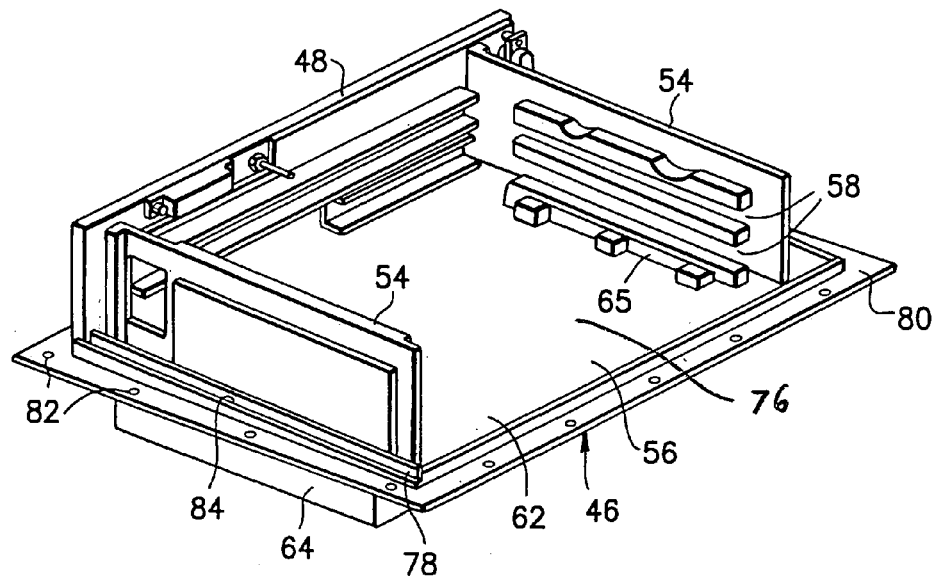
FIG. 6 is a perspective view of some of the housing components of the device shown in FIG. 5.

Referring also to FIGS. 5-6, the interface assembly 26 generally comprises a housing 42 and electronic circuitry 44 located inside the housing. The housing 42 generally comprises a first wall member 46, a housing faceplate member 48, and a second housing member 50. The housing faceplate member 48 comprises a plurality of electrical connectors 52. The electronic circuitry 44 located inside the housing 42 preferably comprises printed circuit boards with electronic components. The electronic circuitry of the interface assembly 26 preferably comprises digital signal encryption and compression electronics. However, in alternate embodiments, the electronic circuitry could provide any suitable type of function(s).

The housing also comprises two heat rail and card slot members 54 (see FIG. 6). The members 54 are fixedly attached to an inside surface 56 of the first wall member 46. The members 54 could have front ends attached to the housing faceplates member 48. The members 54 are preferably comprised of thermally conductive material, such as aluminum. Each of the members 54 comprises slots 58 which face each other for receiving side edges of the printed circuit boards. The printed circuit boards preferably comprise heat conductive end stiffeners, such as aluminum stiffeners, and wedge locks (not shown) are used to connect the printed circuit boards to the heat rail and card slot members 54. However, in alternate embodiments, any suitable type of electronic circuitry could be provided and any suitable type of system for connecting the electronic circuitry inside the housing could be provided. In the embodiment shown, the heat rail and card slot members 54 function as thermal conductors to conduct heat away from the printed circuit boards to the first wall member 46 of the housing.

The second housing member 50 merely comprises bent or folded sheet metal having fastener holes 60 (see FIG. 5) for attaching the second housing member 50 to the first wall member 46 and the housing faceplate member 48. However, in alternate embodiments, any suitable type of system for connecting the second housing member 50 to the other housing members could be provided.

The first wall member 46 generally comprises a first section 62, at least one second section 64, and a third section 65 (see FIG. 6). In the embodiment shown, the first wall member 46 comprises two of the second sections 64 which are laterally spaced from each other. The first section 62 is adapted to be attached to an exterior surface 66 of the aircraft to close an access opening 68 through the exterior surface. The second sections 64 extend outward from the first section and form heat transfer surfaces 70 to transfer heat from the first section 62 to air passing by the exterior surface 66 and second section 64 during flight of the aircraft. The heat transfer surfaces 70 comprise a plurality of heat transfer fins 72. The fins 72 preferably comprise aerodynamically shaped front leading edges 74. However, in alternate embodiments, any suitable type of heat transfer surfaces could be provided. The third section 65 forms a connection section 78 at an inward facing side 56 (i.e., a side facing the fuselage), but could be facing the outward facing tip of the wing.

In the embodiment shown, the first, second and third sections 62, 64, 65 are integrally formed as a one-piece member. More specifically, the three sections 62, 64, 65 are preferably a one-piece metal member, such as cast, forged, or machined aluminum. However, in alternate embodiments, the three sections 62, 64, 65 could be separately formed and subsequently fixedly connected to each other, such as by brazing or welding. The first section 62 comprises a perimeter flange 80 with fastener mounting holes 82 therethrough.

The three sections 62, 64, 65 comprise a heat sink 76. The connection section 78 is adapted to have the housing faceplate member 48 and second housing member 50 connected thereto to form the housing for the electronic device 26. In the embodiment shown, the connection section 78 comprises an upstanding rim with mounting holes therein. The inward facing side 56 also forms a connection area for connecting the heat rail and card slot members 54 to the first wall member 46.

As shown best in FIGS. 3 and 6, the lateral sides of the upstanding rim comprise a general wedge shape. A ledge 84 is formed on the outside edge of the raised rim. A similar ledge is formed at the front side of the raised rim. The bottom of the housing faceplate member 48 and the bottom of the lateral sides of the second housing member 50 are located on the ledge 84. The shape of the wedge of the upstanding rim allows the housing faceplate 48 to be canted off the vertical when the aircraft is at rest on the ground. This allows electrical connectors (not shown) to be connected with the connectors 52 without interfering with other components inside the interior chamber 30.

The housing members 46, 48, 50 are preferably comprised of suitable ferromagnetic material such that the housing members can form an electromagnetic interference (EMI) shield surrounding the electronic circuitry 44 inside the housing. However, in alternate embodiments, the housing members could be comprised of any suitable type of material and an EMI shield could be added as a separate member or as a film attached to the sides of the housing members. In the preferred embodiment shown, the first wall member 46 is preferably a part of the EMI shield.

One of the features of the present invention is the multifunction role of the first wall member 46. The first wall member 46 preferably forms a part of the EMI shield. The first wall member 46 also preferably functions as a cover for closing the access opening 68 through the exterior surface 66. The first wall member 46 also preferably functions as a heat sink to transport heat from the heat rail and card slot members 54 to the air outside the aircraft at the heat transfer surfaces 70. The first wall member 46 also functions as a bottom housing member for the electronic device 26. The first wall member 46 also provides structural and contour features to the bottom airfoil shape of the wing 29. As seen in FIG. 5, the bottom side of the first wall member 46, besides having the heat transfer fins 72, also has a surface 86 which combines with the surface 66 (see FIG. 3) to form the bottom side surface of the airfoil/wing 29. All of the features noted above are being performed, in the preferred embodiment, by a one-piece member; the first wall member 46. In an alternate embodiment of the present invention a flat or curved plate with air flowing over it can transfer heat without necessarily having fins. Thus, the external surface of the housing of the electronics module, which closes the access opening through the airframe, does not need to have heat transfer fins, and could be flat or curved.

Figure 7:
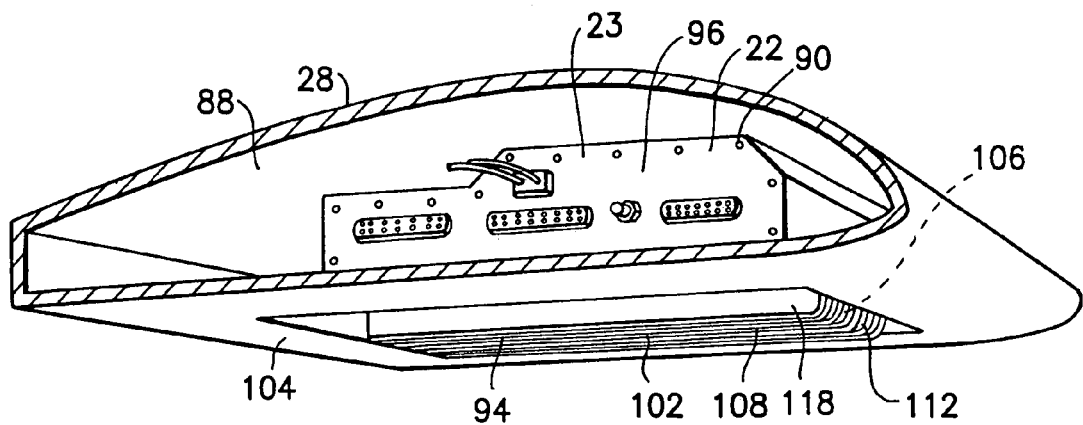
FIG. 7 is a partial diagrammatic cross sectional view of the other wing of the aircraft shown in FIG. 2.
Figure 8:
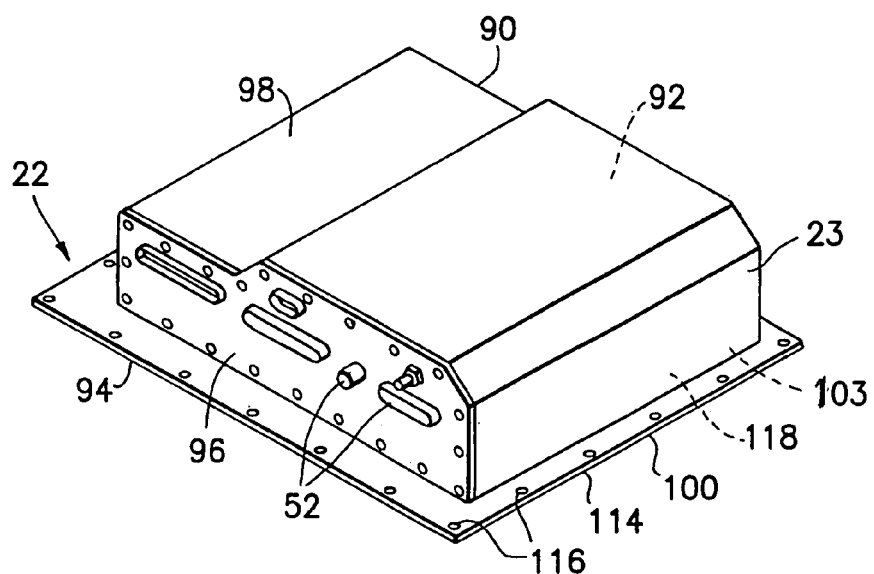
FIG. 8 is a perspective view of the device shown in FIG. 7.
Figure 9:
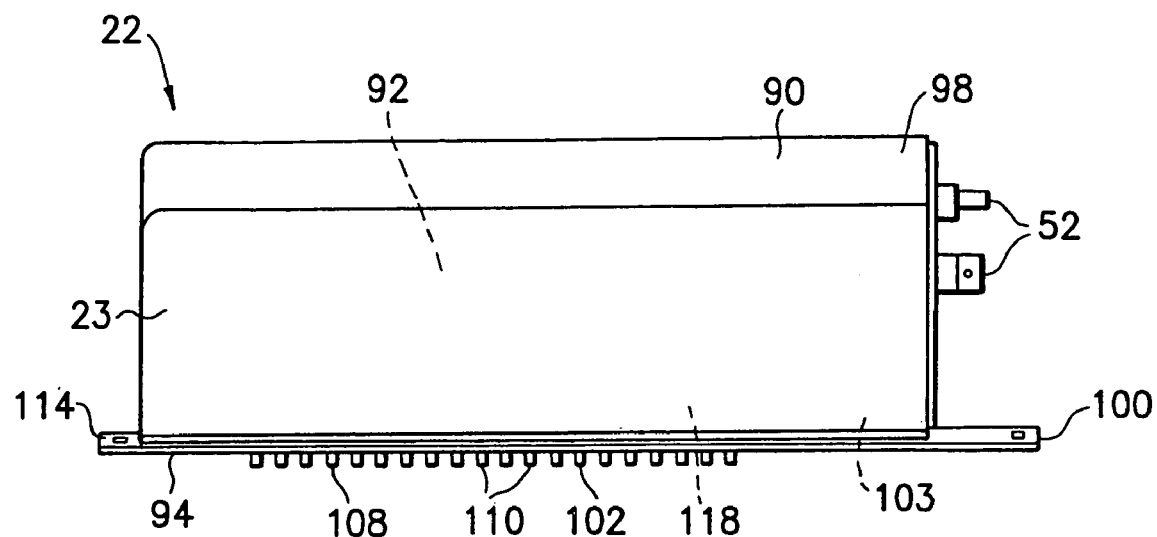
FIG. 9 is a side elevational view of the device shown in FIG. 8.
Figure 10:
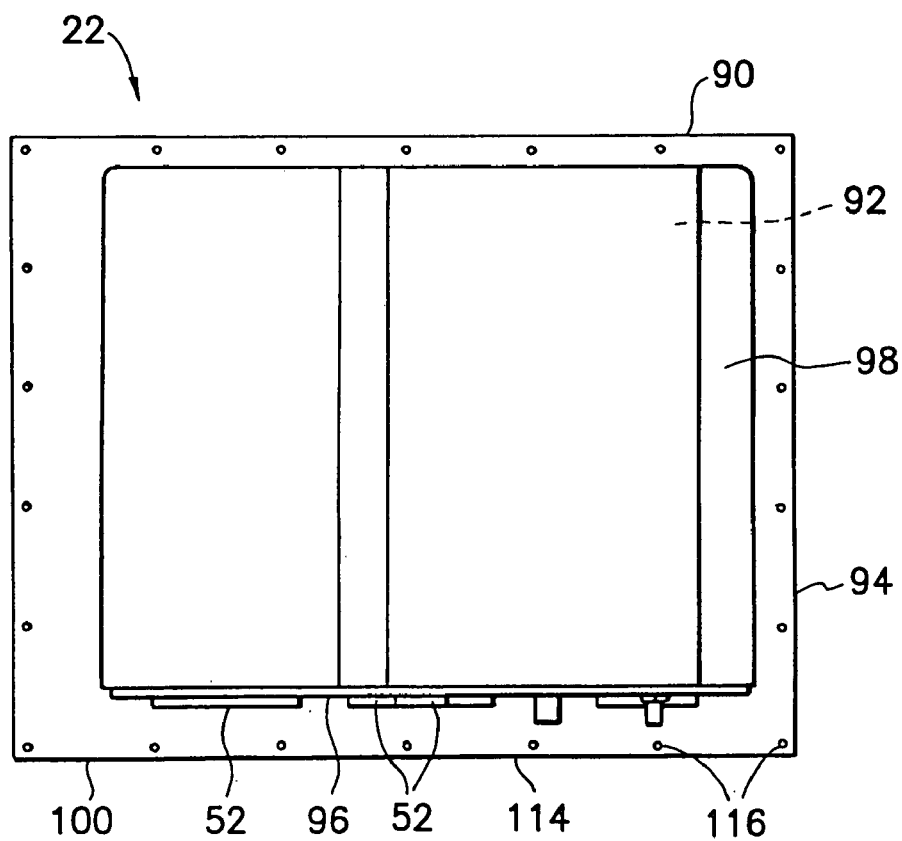
FIG. 10 is a top plan view of the device shown in FIG. 8.

Referring now also to FIG. 7, a cross sectional view of the right wing 28 is shown. In this embodiment, the right wing 28 comprises internal chamber 88 with the modem assembly 22 located therein, and having a portion extending through the bottom side of the airfoil. In an alternate embodiment the right wing could have any suitable electronic device therein and extending through the bottom side of the airfoil. Referring also to FIGS. 8-10, the modem assembly 22 generally comprises a housing 90 and electronic circuitry 92 located inside the housing.

The housing 90 generally comprises a first wall member 94, a housing faceplate member 96, and a second housing member 98. The housing faceplate member 96 comprises a plurality of electrical connectors 52. The electronic circuitry 92 located inside the housing 90 preferably comprises printed circuit boards with electronic components. The electronic circuitry of the modem assembly 22 preferably comprises airborne microwave modem electronics. However, in alternate embodiments, the electronic circuitry could provide any suitable type of functions.

The housing also comprises two heat rail and card slot members (not shown) similar to the heat rail and card slot members 54 shown in FIG. 6. The heat rail and card slot members are fixedly attached to an inside surface of the first wall member 94 and have front ends attached to the housing faceplate member 96. The heat rail and card slot members are preferably comprised of thermally conductive material, such as aluminum. Each of the heat rail and card slot members comprises slots which face each other for receiving side edges of the printed circuit boards. The printed circuit boards preferably comprise heat conductive end stiffeners, such as aluminum stiffeners, and wedge locks (not shown) are used to connect the printed circuit boards to the heat rail and card slot members. However, in alternate embodiments, any suitable type of electronic circuitry could be provided and any suitable type of system for connecting the electronic circuitry inside the housing could be provided. In the embodiment shown, the heat rail and card slot members function as thermal conductors to conduct heat away from the printed circuit boards to the first wall member 94 of the housing.

The second housing member 98 merely comprises bent or folded sheet metal having fastener holes for attaching the second housing member 98 to the first wall member 94 and the housing faceplate member 96. However, in alternate embodiments, any suitable type of system for connecting the second housing member 98 to the other housing members could be provided. The top side of the second housing member 98 is shaped or contoured to fit inside the internal chamber 88.

The first wall member 96 generally comprises a first section 100, one second section 102, and a third section 103. The first section 100 is adapted to be attached to an exterior surface 104 of the aircraft to close an access opening 106 through the exterior surface. In this embodiment, the exterior surface 104 is the bottom side of the wing 28. The second section 102 extends outward from the first section and forms heat transfer surfaces 108 to transfer heat from the first section 100 to air passing by the exterior surface 104 and second section 102. This flowing air assisted heat transfer can occur during flight of the aircraft, during preflight or after-flight conditions such as flowing wind on the wing when the aircraft is at rest, or when a carrying vehicle is moving, such as when the aircraft is on a moving boat, ship, or other aircraft. The heat transfer surfaces 108 comprise a plurality of heat transfer fins 110. The fins 110 preferably comprise aerodynamically shaped front leading edges 112. However, in alternate embodiments, any suitable type of heat transfer surfaces could be provided. The third section 103 forms a connection section on the inward facing side of the first wall member 96.

In the embodiment shown, the first and second sections 100, 102 are integrally formed as a one-piece member. More specifically, the first and second sections 100, 102 are preferably a one-piece metal member, such as cast, forged or machined aluminum. However, in alternate embodiments, the first and second sections 100, 102 could be separately formed and subsequently fixedly connected to each other, such as by brazing or welding. The first section 100 comprises a perimeter flange 114 with fastener mounting holes 116 therethrough.

The three sections 100, 102, 103 form a heat sink 118. The connection section of the third section 103 is adapted to have the housing faceplate member 96 and second housing member 98 connected thereto to form the housing for the electronic device 22. In the embodiment shown, the connection section comprises an upstanding rim with mounting holes therein. The inward facing side also forms a connection area for connecting the heat rail and card slot members to the first wall member 46. Unlike the embodiment shown in FIGS. 3 and 6, in this embodiment the upstanding rim does not have a general wedge shape, and the sides of the second housing member 98 are placed alongside the rim rather than on top of a ledge of the rim.

The housing members 94, 96, 98 are preferably comprised of suitable ferromagnetic material such that the housing members can form an electromagnetic interference (EMI) shield surrounding the electronic circuitry 92 inside the housing. However, in alternate embodiments, the housing members could be comprised of any suitable type of material and an EMI shield could be added as a separate member or as a film attached to the inside surfaces of the housing members. In the preferred embodiment shown, the first wall member 94 is preferably a part of the EMI shield.

One of the features of the present invention is the multifunction role of the first wall member 94. The first wall member 94 preferably forms a part of the EMI shield. The first wall member 94 also preferably functions as a cover for closing the access opening 106 through the exterior surface 104. The first wall member 94 also preferably functions as a heat sink to transport heat from the electronic circuitry to the air outside the aircraft at the heat transfer surfaces 108. The first wall member 94 also functions as a bottom housing member for the electronic device 22. The first wall member 94 also provides structural and contour features to the bottom airfoil shape of the wing 28. As seen in FIG. 7, the bottom side of the first wall member 94, besides having the heat transfer fins 110, also has a curved or contoured surface which combines with the surface 104 to form the bottom side surface of the airfoil/wing 28. All of the features noted above are being performed, in the preferred embodiment, by a one-piece member; the first wall member 94. In this embodiment the faceplate member 96 faces towards the fuselage rather than towards the rear of the wing as with the device 26.

In order to assemble the device 22 with the aircraft, connector cables inside the wing 28 are pulled partially out of the access opening 106 and connected to the connectors 52. The main portion 23 of the device 22 is inserted through the access opening 106 and the flange 114 is attached to the surface 104 by fasteners, such as rivets or screws. Thus, the access opening 106 is closed, the fins 110 are located along a portion of the airfoil on the underside of the wing, and the device can be easily removed for servicing in a reverse fashion if necessary. In an alternate method of assembly, such as when the wings are detachable from the fuselage, the device 22 could be connected to the wing, the connector cables could be attached to the device 22, and the wings could then be attached to the fuselage.

The present invention can reduce overall aircraft system weight by reducing redundant structure. For example, with the present invention a single member forms both a closure to the access opening through the airfoil as well as a side to the electronic device housing. The single member also provides the function of a heat sink. The present invention can reduce the number of parts needed to complete the assembled design because a one-piece member forms the closure to the access opening, a side to the electronic device housing, and the heat sink. The present invention does not require additional fasteners to form these three components into a single unit. The present invention can reduce overall heat resistance through the heat sink by reducing the number of thermal connections. There is only one connection of the heat rail and card slot members to the first wall member. The heat rail and card slot members could be formed integrally with the first wall member. This can provide a weight reduction for the aircraft if there is no redundant structure of a lower chassis floor and an access panel, but instead is a single piece of material between the electronics and the environment. This weight reduction is particularly beneficial in a relatively small UAV.

The design of the thermal paths to the outside fin surfaces can be more easily refined. Refining a symmetric panel to the two electronic chassis can be more easily traded off by one design entity especially in the case where an asymmetric connector interface is realized. The optimizing of the thermal paths through the fabricated pieces can be more easily preformed by a single build entity. The present invention can reduce the paths or openings for precipitation to enter the aircraft volume 30 or 88. The member 46 or 94 which closes the access opening through the airfoil forms a side to the electronic device and, therefore, does not require any holes through the airfoil surface of the member to attach to a separate electronic device housing; only the airfoil mounting holes 82, 116 are needed.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An aircraft component comprising:
    a first section adapted to be attached at an exterior surface of an aircraft to close an access opening through the exterior surface;
    a second section extending outward from the first section and forming at least one heat transfer surface to transfer heat from the first section to air passing by the exterior surface and second section, wherein the first and second sections are integrally formed as a one-piece member; and
    a heat sink comprising the first and second sections, and wherein a third section is provided at an inward facing side with a connection section adapted to have housing walls attached to the connection section to form a housing for an electronic device.

2. An aircraft component as in claim 1 wherein the aircraft component is comprised of ferromagnetic material to form an electromagnetic interference (EMI) shielding member.

3. An aircraft electronic device comprising:
    electronic circuitry comprising at least one printed circuit board; and
    a housing having the electronic circuitry located in the housing, the housing comprising an aircraft component forming a first housing member and at least one second housing member attached to the aircraft component to form an enclosure housing the electronic circuitry, wherein the aircraft component comprises:
        a first section adapted to be attached at an exterior surface of an aircraft to close an access opening through the exterior surface; and
        a second section extending outward from the first section and forming at least one heat transfer surface to transfer heat from the first section to air passing by the exterior surface and second section,
        wherein the first and second sections are integrally formed as a one-piece member.

4. An aircraft electronic device as in claim 3 wherein the electronic circuitry comprises an airborne microwave modem assembly.

5. An aircraft electronic device as in claim 3 wherein the electronic circuitry comprises digital signal encrypting and compression electronics.

6. An aircraft comprising:
    a drive unit;
    an air frame comprising at least one airfoil, the drive unit being attached to the air frame; and
    an aircraft electronic device as in claim 3 connected to the airfoil.

7. An aircraft as in claim 6 wherein the airfoil is a wing of the aircraft, and wherein the at least one heat transfer surface extends from a bottom side of the wing.

8. An aircraft electronic device comprising:
    electronic circuitry which generates heat; and
    a housing having the electronic circuitry located in the housing, the housing comprising a first wall member with a heat sink section that extends in an outward direction at an outer side of the first wall member, and a connection section located at an inner side of the first wall member, wherein other walls of the housing are attached to the connection section to form an enclosure housing the electronic circuitry, and wherein the first wall member further comprises a flange extending from the connection section which is sized and shaped to be attached to an exterior side of an aircraft, wherein the electronic circuitry comprises at least one printed circuit board, and the housing comprises heat rail and card slot members on opposite sides of the printed circuit board, wherein sides of the printed circuit board are attached to the heat rail and card slot members, and wherein the heat rail and card slot members are attached to the inner side of the first wall member.

9. An aircraft electronic device as in claim 8 wherein the heat sink section comprises heat transfer fins extending in the outward direction.

10. An aircraft electronic device as in claim 8 wherein the flange comprises a perimeter flange which surrounds the connection section, and wherein the flange comprises holes adapted to receive fasteners to attach the flange to the exterior side of the aircraft.

11. An aircraft electronic device as in claim 8 wherein the housing, including the first wall member, forms an electromagnetic interference (EMI) shield surrounding the electronic circuitry.

12. An aircraft electronic device as in claim 8 further comprising an electromagnetic interference (EMI) shield surrounding the electronic circuitry, the EMI shield comprising the first wall member.

13. An aircraft electronic device comprising:
electronic circuitry which generates heat; and
a housing having the electronic circuitry located in the housing, the housing comprising a first wall member with a heat sink section that extends in an outward direction at an outer side of the first wall member, and a connection section located at an inner side of the first wall member, wherein other walls of the housing are attached to the connection section to form an enclosure housing the electronic circuitry, and wherein the first wall member further comprises a flange extending from the connection section which is sized and shaped to be attached to an exterior side of an aircraft,
wherein the electronic circuitry comprises an airborne microwave modem assembly.

14. An aircraft electronic device comprising:
electronic circuitry which generates heat; and
a housing having the electronic circuitry located in the housing, the housing comprising a first wall member with a heat sink section that extends in an outward direction at an outer side of the first wall member, and a connection section located at an inner side of the first wall member, wherein other walls of the housing are attached to the connection section to form an enclosure housing the electronic circuitry, and wherein the first wall member further comprises a flange extending from the connection section which is sized and shaped to be attached to an exterior side of an aircraft,
wherein the electronic circuitry comprises an airborne link interface assembly comprising digital signal encryption and compression electronics.

15. An aircraft electronic device comprising:
electronic circuitry which generates heat; and
a housing having the electronic circuitry located in the housing, the housing comprising a first wall member with a heat sink section that extends in an outward direction at an outer side of the first wall member, and a connection section located at an inner side of the first wall member, wherein other walls of the housing are attached to the connection section to form an enclosure housing the electronic circuitry, and wherein the first wall member further comprises a flange extending from the connection section and adapted to be attached to an exterior side of an aircraft,
wherein the connection section of the first wall member comprises a wedge shaped section adapted to have the other walls of the housing located thereon.

16. An aircraft comprising:
a drive unit;
an air frame comprising at least one airfoil, the drive unit being attached to the air frame; and
an electronic communications device connected to the air frame, wherein the electronic communications device comprises a printed circuit board and a housing, wherein the housing has a first side section connected at an exterior side of the airfoil to close an access opening through the airfoil, and wherein the first side section of the housing forms a wall of an enclosure for the printed circuit board,
wherein the first side section comprises a heat sink located in the access opening of the airfoil, and wherein the heat sink comprises heat transfer fins extending outward from the airfoil.

17. An aircraft as in claim 16 wherein the housing forms an electromagnetic interference (EMI) shield around the printed circuit board.

18. An aircraft as in claim 16 wherein the first side section comprises a perimeter flange with holes therethrough for attaching the first side section to the exterior side of the airfoil.

19. An aircraft as in claim 16 wherein the first side section forms a structural and contour component for the airfoil.

20. A method of assembling an electronic device with an aircraft comprising steps of:
providing the electronic device with a housing having a side with a heat sink;
inserting the electronic device into an access aperture in the aircraft; and
attaching the side of the housing of the electronic device to the aircraft to close the access aperture, wherein the heat sink is located in the access aperture and at an exterior of the aircraft.

21. An aircraft electronic device comprising:
electronic circuitry which generates heat; and
a housing comprising a first wall member and a second wall member, wherein the first wall member comprises a heat sink section and a connection section, wherein the second wall member is attached to the first wall member to at least partially enclose the electronic circuitry in the housing, and wherein the connection section is sized and shaped to be attached to an aircraft with the heat sink section located at an exterior of the aircraft to transfer heat directly from the heat sink section to air passing along the exterior of the aircraft, wherein the heat sink section comprises heat transfer fins extending in an outward direction relative to the exterior of the aircraft.

* * * * *